Dec. 15, 1936.    F. W. JACKMAN    2,064,206
COMPOSITE MOTION PICTURE
Filed Jan. 23, 1934
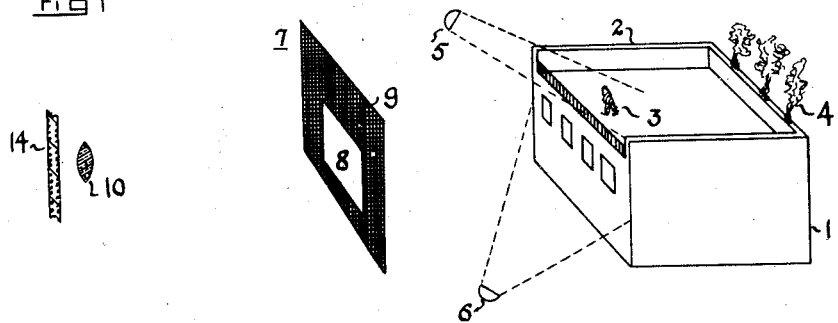
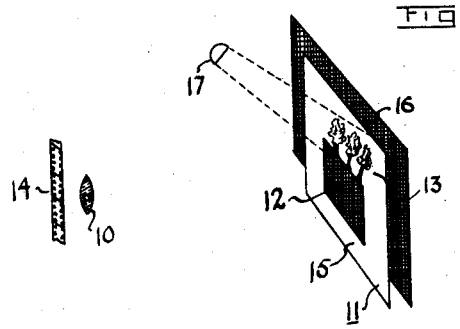
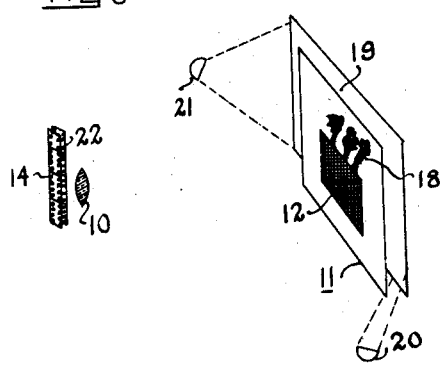
INVENTOR:
Fred W. Jackman.
BY W. E. Beatty
ATTORNEY.

Patented Dec. 15, 1936

2,064,206

UNITED STATES PATENT OFFICE 2,064,206

COMPOSITE MOTION PICTURE

Fred W. Jackman, Beverly Hills, Calif., assignor to Warner Bros. Pictures, Inc., New York, N. Y., a corporation of Delaware Application January 23, 1934, Serial No. 707,940

4 Claims. (Cl. 88—16)

The invention relates to composite motion pictures comprising a background scene and in addition thereto a plurality of component parts, one of which is of such intricate design that it is difficult to print it onto the final negative by the usual matte process.

The usual matte process referred to above will now be explained in connection with printing a background scene around an apartment house, which is a component of simple configuration, and one or more trees on an open portion of the penthouse of the apartment, which trees comprise a component of intricate design. According to the ordinary matte process, if a background scene were to be printed around the simple and intricate components just mentioned, both components would first be photographed, and then a matte such as a glass in front of the camera would be painted to have opaque portions corresponding to the simple and intricate components. This is very difficult to do because of the obvious difficulty in matching with a paintbrush the intricate pattern of the branches and leaves of the tree. According to the invention this difficulty is overcome by first photographing only the component of simple design, while matting out the element of intricate design if it is present, by secondly preparing a matte to protect the light sensitive material in the region where the simple component has been photographed, while at the same time photographing a painted representation of the component of intricate design, and thirdly extending the last-mentioned matte to include also the painted intricate element and thereafter printing a background adjoining the two previous photographic impressions.

For further details of the invention reference may be made to the drawing wherein:

Fig. 1 is a schematic representation in perspective of an arrangement for performing the first step of the method.

Fig. 2 is a schematic perspective view of a photographing arrangement according to the invention for performing the second step of the method.

Fig. 3 is a schematic perspective view of a photographing arrangement for performing the third and final step of the method.

Referring to Fig. 1 the apartment house 1, having a fire wall 2, comprises a component of simple configuration. The fire wall 2 extends to a height greater than the height of the action 3 which is adapted to take place on the roof of the apartment house. On the top of the fire wall 2 are arranged one or more trees, shrubs or other objects 4 of intricate design. The action 3 and the top of the apartment house are illuminated by one or more lamps 5. The front of the apartment house is illuminated by one or more lamps 6. The apartment house 1 and action 3 thus illuminated are photographed through a glass 7 having a transparent portion 8 corresponding to the outline of the apartment house 1 exclusively. The top line of the transparent portion 8 focused on the film 14 by the lens 10 of the camera being in alignment with the top of the fire wall 2, that portion of the glass 7 surrounding the transparent portion 8 is painted or otherwise made opaque as illustrated at 9. Therefore, as the first step in the method the light sensitive film 14 is light impressed only with the component of simple configuration.

As the second step in the method, a glass 11 is painted or otherwise made opaque at the center portion 12 thereof corresponding to the transparent portion 8 of the glass 7 in Fig. 1, and in addition thereto, combining with the top of the opaque portion 12, is painted a representation 13 of the component 4 of intricate design. As pointed out above, it is a much simpler operation to paint the component 13 to represent a tree than it is to prepare a matte which will exactly match the actual image of a tree. That portion of the glass 11 which is exterior to the opaque portion 12 is transparent as represented at 15. Behind the glass 11 is arranged a black drop 16, and the painted component 13 is suitably illuminated by a lamp 17. The component 13 thus illuminated is photographed on the previously partly exposed film 14 this film of course being re-wound to its original start position at the beginning of this operation. The result of the second step in the method is therefore to additionally light impress the film 14 with the element 13 of intricate design and in juxtaposition to the previous light impression of the apartment house 1 as explained in connection with Fig. 1.

The third step of the method is accomplished by extending the opaque portion 12 as represented at 18 to correspond to and form a silhouette of the painted element 13 in Fig. 2. The glass 11 thus modified is arranged in front of a white drop 19 suitably illuminated with lamps 20 and 21 to furnish a printing light in order to print the background scene on the film 22 onto the film 14, avoiding its previously exposed portions. It will be understood that in this operation, the films 14 and 22 are run together through the camera, the objective lens for which is diagrammatically represented here at 10, as in the other figures.

As a result of the method, the film 14 is light impressed in mutually exclusive areas with an image of the apartment house 1 together with the action 3, the painted element 13, and the background scene on the positive film 22.

Having thus described the invention what is claimed as new and desired to secure by Letters Patent is:

1. The method of making a composite picture of a background scene and of two additional component parts, one of which has an intricate configuration for which a matte would be difficult to form, which method comprises photographing on a portion only of a light sensitive surface the component of simple design, preparing a representation of the component of intricate design, photographing said representation on another portion of said light sensitive surface, rendering said representation opaque and non-reflective and employing the same with another matte for protecting the two portions of the light sensitive surface thus exposed while printing a background there-adjacent.

2. The method of making a composite picture of a background scene and of two additional component parts, one of which has a configuration such that a matte thereof may be readily formed and the other of which has an intricate configuration for which a matte would be difficult to form, which method comprises photographing on a portion of a light sensitive surface the component of simple design, while protecting by a matte the portion of said surface on which the images of the component of intricate design and of said background scene are to be exposed, preparing a representation of the component of intricate design and photographing the same on said light sensitive surface while protecting the portion thereof previously exposed by a matte of the component of said simple design, forming an opaque and non-reflective combined matte of said component of simple design and of the outline of said representation of said component of intricate design, and protecting the two portions of the light sensitive surface thus exposed by said combined matte while printing the background there-adjacent.

3. The method of making a composite picture of a background scene and of two additional component parts, one of which has a configuration such that a matte thereof may be readily formed and the other of which has an intricate configuration for which a matte would be difficult to form, which method comprises arranging action within the boundaries of the component of simple configuration, light impressing a portion of a light sensitive surface with an image of said action and said simple component while protecting the remainder of said surface with a matte of said background scene and said component of intricate design, protecting the portion of the light sensitive surface thus exposed by a matte of said component of simple design while photographing a representation of said intricate component, forming a combined opaque and non-reflective matte of said simple component and of the outline of said representation of said component with intricate configuration, protecting both portions of said surface thus exposed by said combined matte while printing a background therefor on the remaining portion of said light sensitive surface.

4. The method of making a composite picture of a scene having simple and intricate components which comprises light impressing a portion of a light sensitive surface with an image of said simple component while matting out the portion where the image of said intricate component is to appear, protecting the portion of said surface thus exposed by a matte of said simple component while photographing thereadjacent a representation of said intricate component, and protecting the portions of said surface which have been exposed in accordance with said simple component and the representation of said intricate component by a combination opaque and non-reflective matte of said simple component and of the outline of the representation of said intricate component while printing a background there-adjacent.

FRED W. JACKMAN.